(12) United States Patent
Kase et al.

(10) Patent No.: US 6,683,985 B1
(45) Date of Patent: Jan. 27, 2004

(54) METHOD OF DISCRIMINATING SHAPE OF FREE-FORM CURVED SURFACE

(75) Inventors: Kiwamu Kase, Wako (JP); Akitake Makinouchi, Wako (JP); Tetsuya Kondo, Isehara (JP); Naomichi Mori, Isehara (JP)

(73) Assignees: Riken, Wako (JP); Amada Company, Limited, Kanagawa (JP)

(*) Notice: Subject to any disclaimer, the term of this patent is extended or adjusted under 35 U.S.C. 154(b) by 0 days.

(21) Appl. No.: 09/403,589

(22) PCT Filed: Apr. 22, 1998

(86) PCT No.: PCT/JP98/01842
§ 371 (c)(1),
(2), (4) Date: Oct. 25, 1999

(87) PCT Pub. No.: WO98/49524
PCT Pub. Date: Nov. 5, 1998

(30) Foreign Application Priority Data

Apr. 25, 1997 (JP) ............................................. 9-109139

(51) Int. Cl.$^7$ ................................................. G06K 9/46
(52) U.S. Cl. ....................... 382/203; 382/141; 702/155; 345/964
(58) Field of Search ................................. 382/203, 141, 382/224; 700/182; 702/155; 706/919; 345/964

(56) References Cited

U.S. PATENT DOCUMENTS

| 4,679,331 A | * | 7/1987 | Koontz .......................... 33/551 |
| 5,117,169 A | * | 5/1992 | Kakino et al. .............. 318/578 |
| 5,715,166 A | * | 2/1998 | Besl et al. ................... 700/182 |
| 5,844,801 A | * | 12/1998 | Kodama et al. ............. 700/110 |
| 5,991,703 A | * | 11/1999 | Kase ........................... 702/167 |
| 6,285,320 B1 | * | 9/2001 | Olster et al. ................. 342/464 |

FOREIGN PATENT DOCUMENTS

JP        4-276513        10/1992

OTHER PUBLICATIONS

Curves and Surfaces for CAGD, G. Farin, 4$^{th}$ Ed., Chapter 22, W. Boehm: Differential Geometry II, pp. 348–355.
Inst. of Physical and Chemical Research—Riken, "Improvements in a shell element formulation for Accurate prediction of sheet metal forming defects", M. Kawka et al., pp. 675–678.
VDI Berichte NR. 894, 1991, "Simulation of 3–D Sheet bending processes", H. Tazikawa et al., pp. 167–183.

* cited by examiner

*Primary Examiner*—Jon Chang
(74) *Attorney, Agent, or Firm*—Griffin & Szipl

(57) ABSTRACT

A principle curvature of a target curved surface S' and a principle curvature of a corresponding position of a reference surface S are obtained and each part is displayed by being classified into (a) a case where two principle curvatures increase, (b) a case where two principle curvatures decrease, and (c) a case where one of the principle curvatures increases and the other decreases from the difference between the principle curvatures. (a), (b), and (c) are determined as mountain, valley, and twist, respectively, and are displayed in different symbols or colors on an image. Consequently, a different part between two three-dimensional shapes can be accurately grasped, the cause of the occurrence of the error such as a partial curve or the like can be easily found, how much the shapes coincide with each other as a whole can be indicated by an objective numerical value, and the error can be easily determined even if the reference shape is complicated.

10 Claims, 4 Drawing Sheets

Object Curved Surface (+: Mount, -: Valley, %: Twist)

(+:Mount  -:Valley  %:Twist)

(+:Mount  -:Valley  %:Twist)

METHOD OF DISCRIMINATING SHAPE OF FREE-FORM CURVED SURFACE

This application claims priority on Japanese Patent Application No. 10-9139/1997, filed Apr. 25, 1997, the entire diclosure which is incorporated herein by reference.

BACKGROUND OF THE INVENTION

1. Technical Field

The present invention relates to a method of determining a shape error of a free-form surface.

2. Background Art

With respect to formings formed by press working such as the body of an automobile, discrepancy has been conventionally evaluated by experiences. That is, the free-form surface has been conventionally evaluated mainly by "visual observation". In recent years, however, designing using a computer (CAD) has been spread and a deformation upon processing can be simulated. Accordingly, means for evaluating a free-form surface, that is, for objectively defining discrepancy in a forming and displaying it is desired.

FIG. 1 shows a forming sample showing discrepancy in a plate forming. FIG. 2 is a diagram showing an example of a conventional method of evaluating a shape error in a free-form surface. The example relates to a result of numerical simulation using simulation software (ITAS-3D) reported in "Simulation of 3-D sheet bending process" (Takizawa et al., 1991, VD1 BERICHTE NR. 894), "Some advances in FEM simulation of sheet metal forming processes using shell elements" (Kawka et al., 1995, Simulation of Materials Processing, Shen & Dawson (eds.), Balkema, Rotteerdam, pp. 735–740), and the like.

In FIG. 2, a white part shows a shape as a reference (for example, the shape of a die) and a mesh part indicates a shape obtained by a forming simulation. The reference shape and the simulation shape are displayed at the same position and only a part positioning on the front side is displayed. Consequently, a shape error between the simulation shape and the reference shape can be roughly determined from the displayed white and mesh parts. The method has, however, the following problems.

(1) It is necessary to determine a reference position and make the reference shape and the simulation shape accurately coincide with each other at the reference position. The result is largely influenced according to the way the reference position is determined.

(2) Since the position of the other part is largely displaced due to a partial bending, it is difficult to find the cause of occurrence of an error.

(3) How much the shapes coincide with each other as a whole cannot be shown by an objective numerical value.

FIG. 3 shows CMM data (about 40,300 points) measured by using a three coordinate measuring machine "Mitsutoyo Super BHN 506". FIG. 4 shows the top view of FIG. 3 (about 8,000 points). As shown in these figures, the shape of a forming item actually formed by using a die can be displayed as images as shown in FIGS. 3 and 4 by measuring the forming item by the three coordinate measuring machine. From the images, shape errors such as projected and recessed parts and a twisted part can be roughly determined from the views. The method, however, also has the above-mentioned problems (2) and (3) in the numerical simulation and has a problem that (4) when the reference shape is not flat but has a complicated curve, the difference from the result of the three coordinate measurement can be hardly determined.

As mentioned above, methods of experiment, measurement, and display of result for evaluating the shape error have not been systematized yet. There has not been a simple and clear definition as an index of a forming discrepancy and, further, an evaluation method which can be repeatedly performed has not been existed conventionally.

SUMMARY OF THE INVENTION

The present invention is made in order to solve the problems. That is, a principle object of the invention is to provide a method of determining a shape error of a free-form surface which can accurately grasp a different part between two three-dimensional shapes of an actual forming shape and a simulation shape by a computer simulation, a reference shape by CAD, or the like. It is another object of the invention to provide a method of determining a shape error of a free-form surface which can be applied without making the reference positions accurately coincide with each other, find the cause of occurrence of an error such as a partial bending, show how much the shapes coincide with each other as a whole by an objective numerical value, and easily determine the error even if the reference shape is complicated.

The inventors of the present invention have invented "extended Gaussian curvature" as an evaluation model which does not depend on the coordinate system. According to the invention, a local shape error of a free-form surface is classified into three types (mountain, valley, and twist) by comparing an actual curved surface with, for example, a CAD curved surface as a reference. A method of calculating the ratio of the same labels by using the image processing technique has also been invented. The invention is based on the novel ideas.

According to the invention, there is provided a method of determining a shape error of a free-form surface by obtaining a principle curvature of a target curved surface S' and a principle curvature of a corresponding position of a reference surface S; and displaying each part by classifying it from the difference between the principle curvatures into (a) a case where the two principle curvatures increase, (b) a case where the two principle curvatures decrease, and (c) a case where one of the principle curvatures increases and the other decreases.

That is, according to a preferred method of the invention, $\Delta\kappa_1 = \kappa_1' - \kappa_1$, $\Delta\kappa_2 = \kappa_2' - \kappa_2$ are obtained from the principle curvature ($\kappa_1'$, $\kappa_2'$) of the target curved face S' and the principle curvature ($\kappa_1$, $\kappa_2$) of the reference curved face S. (1) When $\Delta\kappa_1 \geq 0$ and $\Delta\kappa_2 \geq 0$, (a) it is determined that the two curvatures increase. (2) When $\Delta\kappa_1 \leq 0$ and $\Delta\kappa_2 \leq 0$, (b) it is determined that two curvatures decrease. (3) When $\Delta\kappa_1 \cdot \Delta\kappa_2 < 0$, (c) it is determined that one of the curvatures increases and the other decreases. Preferably, (a), (b), and (c) are determined as mountain, valley, and twist, respectively, and are displayed in different symbols or colors on an image. Further, it is preferable that the ratio of the same labels is calculated from the labels (a), (b), and (c) and is used as a coincidence ratio.

The Gaussian curvature K is a product $\kappa_1\kappa_2$ of the principle curvatures $\kappa_1$ and $\kappa_2$ of three-dimensional surfaces. (1) When K>0, it is known that the shape is elliptic. (2) When K=0, it is known that the shape is parabolic. (3) When K<0, it is known that the shape is hyperbolic.

The invention relates to an extended Gaussian curvature. That is, according to the method of the invention, the principle curvature of a target curved surface S' including an error and the principle curvature of a corresponding position of a reference curved surface S are obtained and each part is classified into (a), (b), and (c) from the difference between the principle curvatures, namely, the parts can be displayed while being classified into the case where two principle curvatures increase, the case where two principle curvatures decrease, and the case where one of the principle curvatures increases and the other decreases. Thus, the different part between two three-dimensional shapes can be accurately grasped.

According to the method, the shape error can be determined by obtaining the principle curvatures of corresponding positions. Consequently, the invention can be applied without making the reference positions of two three-dimensional shapes accurately coincide with each other and the cause of occurrence of an error such as a partial bending can be found.

Further, by calculating the ratio of the same labels from the labels (a), (b), and (c) and using it as a coincidence ratio, how much the shapes coincide with each other as a whole can be grasped by an objective numerical value and an error can be easily determined even if the reference shape is complicated.

The other objects and advantageous features of the invention will be made clear from the following description with reference to the attached drawings.

DESCRIPTION OF THE PREFERRED EMBODIMENTS

Figure 1:
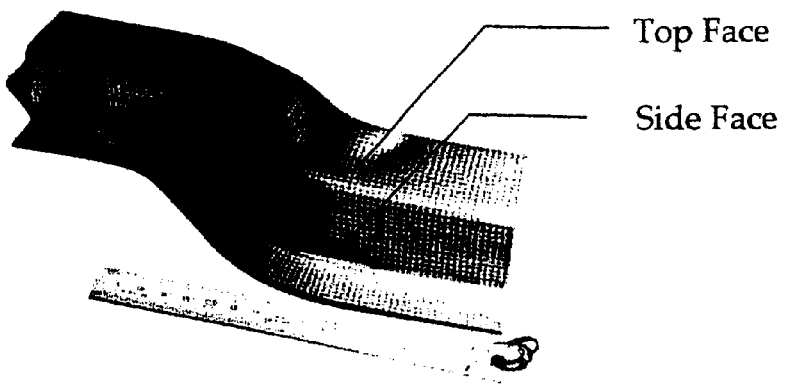
FIG. 1 is a halftone image displayed on a display of a forming sample showing a discrepancy of a plate forming.

The principle of the method of the invention will be first described.

Free-form surface $S=S(u, v)$ is expressed by parameters u and v. Expression 1 is a relational expression in differential geometry. The relation is disclosed in, for example, "Curves and Surfaces for Computer Aided Geometric Design" (Farin. G. 1988, A Practical Guide, Academic Press).

$$E = S_u S_u, F = S_u S_v, G = S_v S_v, L = nS_{uu}$$
$$M = nS_{uv}, N = nS_{vv}, n = \frac{S_u \times S_v}{\|S_u \times S_v\|}$$
[Expression 1]

When it is assumed that $\lambda = dv/du$, a normal curved surface $\kappa$ at an arbitrary point $S(u, v)$ is expressed as Expression 2 in accordance with Expression 1.

$$\kappa(\lambda) = \frac{L + 2M\lambda + N\lambda^2}{E + 2F\lambda + G\lambda^2}$$
[Expression 2]

The principle curvatures are $\kappa_1, \kappa_2$ which are obtained by solving the following Expression 3 and the Gaussian curvature K is defined as $\kappa_1 \kappa_2$. That is the definition of the conventional Gaussian curvature.

$$\kappa^2 - \frac{NE - 2MF + LG}{EG - F^2}\kappa + \frac{LN - M^2}{EG - F^2} = 0$$
[Expression 3]

The definition of an extended Gaussian curvature ($\Lambda$) invented by the inventors of the present invention can be expressed by Expression 4.

If $(\kappa_1' - \kappa_1)(\kappa_2' - \kappa_2) \geq 0$ then $\Lambda =$ [Expression 4]

$$\text{sgn}(\kappa_1' - \kappa_1)(\kappa_1' - \kappa_1)(\kappa_2' - \kappa_2)$$

else $\Lambda = \text{abs}((\kappa_1' - \kappa_1)(\kappa_2' - \kappa_2))$

ただし $\text{sgn}(a) = \begin{cases} 1 (a \geq 0) \\ -1 (a < 0) \end{cases}, \text{abs}(a) = \begin{cases} a (a \geq 0) \\ -a (a < 0) \end{cases}$ That is, according to the method of the invention, first, $\Delta\kappa_1 = \kappa_1' - \kappa_1$ and $\Delta\kappa_2 = \kappa_2' - \kappa_2$ are obtained from the principle curvature ($\kappa_1'$, $\kappa_2'$) of the target curved surface S' and the principle curvature ($\kappa_1$, $\kappa_2$) of the reference curved surface S. (1) When $\Delta\kappa_1 \geq 0$ and $\Delta\kappa_2 \geq 0$, (a) it is determined that the two curvatures increase. (2) When $\Delta\kappa_1 \leq 0$ and $\Delta\kappa_2 \leq 0$, (b) it is determined that two curvatures decrease. (3) When $\Delta\kappa_1 \cdot \Delta\kappa_2 < 0$, (c) it is determined that one of the curvatures increases and the other decreases. (a), (b), and (c) are discriminated as mountain, valley, and twist, respectively, and are displayed by different symbols or colors on an image.

In other words,
(1) when $(\kappa_1' - \kappa_1)(\kappa_2' - \kappa_2) \geq 0$ and $(\kappa_1' - \kappa_1) \geq 0$, a label "mountain" is appended to $\Lambda$.
(2) When $(\kappa_1' - \kappa_1)(\kappa_2' - \kappa_2) \geq 0$ and $(\kappa_1' - \kappa_1) < 0$, a label "valley" is appended to $\Lambda$.
(3) When $(\kappa_1' - \kappa_1)(\kappa_2' - \kappa_2) < 0$, a label "twist" is appended to $\Lambda$.

[Embodiments]

Embodiments in which the method of the invention is applied will be described hereinbelow with reference to the drawings.

(Embodiment 1)

Figure 5:
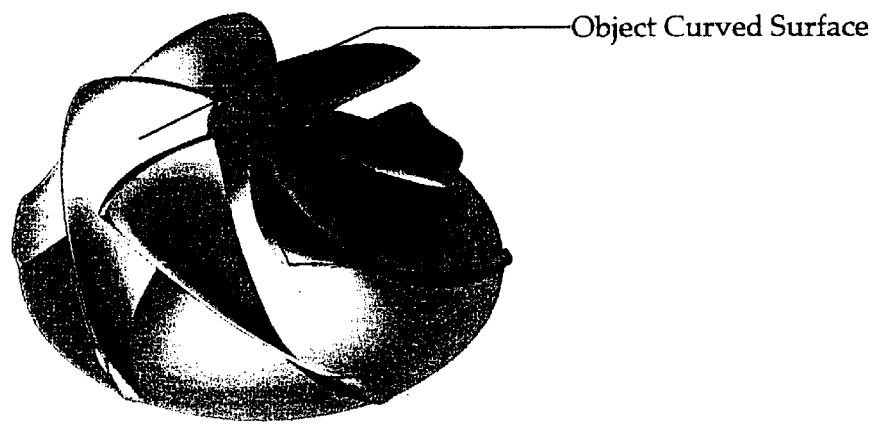
FIG. 5 is a halftone image displayed on a display showing a perspective view of an impeller.
Figure 6:
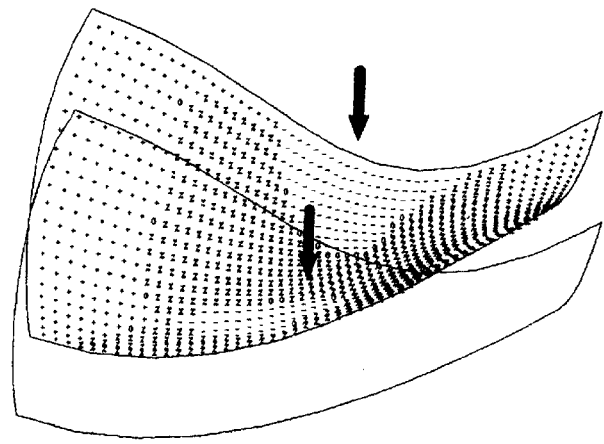
FIG. 6 is a diagram showing that a twist deformation according to the method of the invention is performed to an originally twisted shape.
Figure 7:
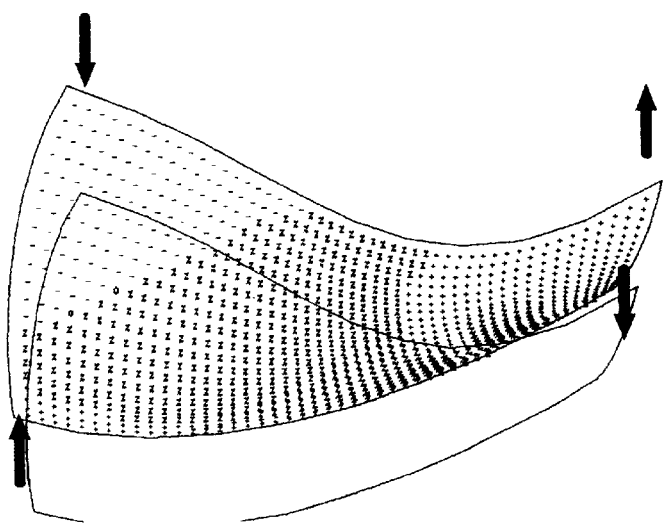
FIG. 7 is a diagram showing that a twist deformation according to the method of the invention is performed to an originally twisted shape.

FIG. 5 is a perspective view of an impeller. FIGS. 6 and 7 show the results of application of the method of the invention. FIG. 6 shows a case where a blade is bent and FIG. 7 shows a case where the blade is twisted by applying forces shown by the arrows.

In FIGS. 6 and 7, the labels "mountain", "valley", and "twist" according to the invention are indicated by symbols "+", "−", and "%", respectively. In an actual image display, it is preferable to show the "mountain", "valley", and "twist" in colors such as brown, blue, and red, respectively. By displaying the determination of the shape error, a different part from the original three-dimensional curved face can be grasped easily and accurately by the different labels or different colors.

According to the method of the invention, the ratio of the same labels is calculated from the labels (a), (b), and (c) and is used as a coincidence ratio. That is, the labels of "mountain", "valley", and "twist" are mapped on pixels of a parameter plane ([0, 1]×[0, 1]) of u, v and the parameter plane is divided into lattice at a proper pitch (d). By applying a coincidence ratio (ψ) of Expression 5, how much the shapes coincide with each other can be shown by an objective numerical value. The coincidence ratio (ψ) indicates the relevance factor of the kind of the label. Since there is conventionally no index of discrepancy in a forming item, the coincidence ratio (ψ) can be used as a simple and clear index. It can be further developed and can be further finely divided in accordance with the magnitude of the extended Gaussian curvature (Λ).

$$\psi = \frac{\text{(number\_of\_the\_same\_label)}}{d^2} \times 100(\%) \qquad \text{[Expression 5]}$$

(Embodiment 2)

Figure 2:
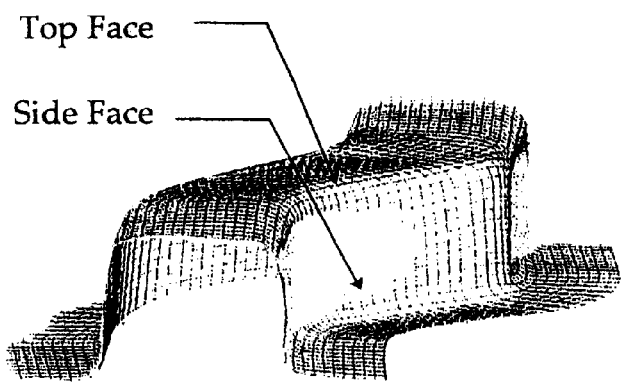
FIG. 2 is a diagram showing an example of a conventional method of evaluating an error in a free-form surface using simulation.
Figure 4:
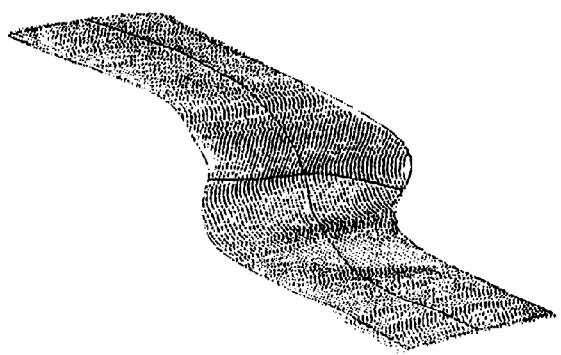
FIG. 4 is the top view of FIG. 3.
Figure 8:
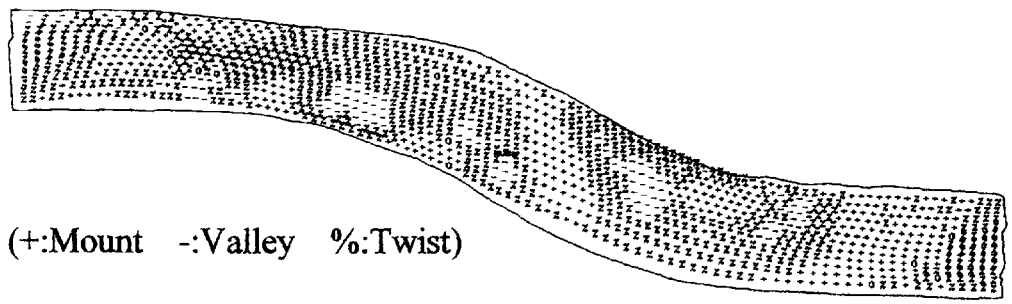
FIG. 8 shows an example of applying the method of the invention on the basis of measurement data.
Figure 9:
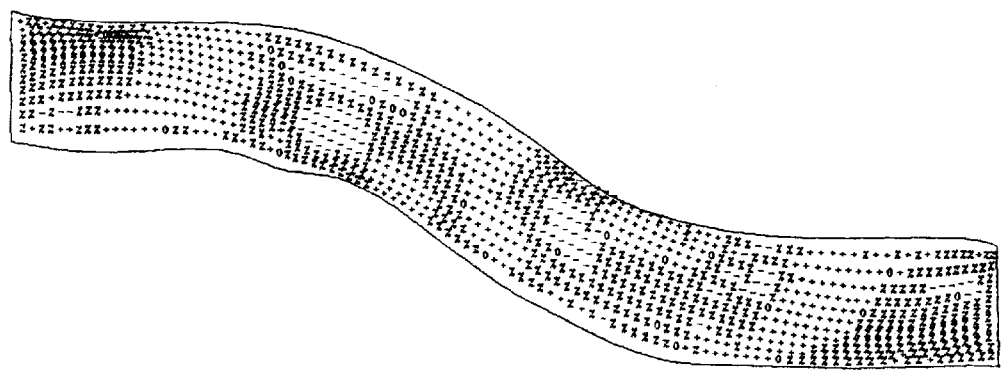
FIG. 9 shows an example of applying the method of the invention on the basis of the result of numerical simulation.

FIG. 8 shows an application example of the method of invention on the basis of the measurement data of FIG. 4. FIG. 9 shows an application example of the method of the invention on the basis of the numerical simulation result of FIG. 2. That is, FIGS. 8 and 9 show CMM data and FEM data, respectively. The data has been subjected to surface fitting of a solid modeler "DESIGNBASE" (manufactured by Richo) with an allowance of 0.002 mm from the original point. In this case, the coincidence ratio (ψ) is 50.23%.

Although the labels "mountain", "valley", and "twist" in the invention are shown by symbols of +, −, and %, respectively, also in FIGS. 8 and 9, it is preferable that the mountain, valley, and twist are shown by colors such as brown, blue, and red, respectively, in an actual image display.

Figure 3:
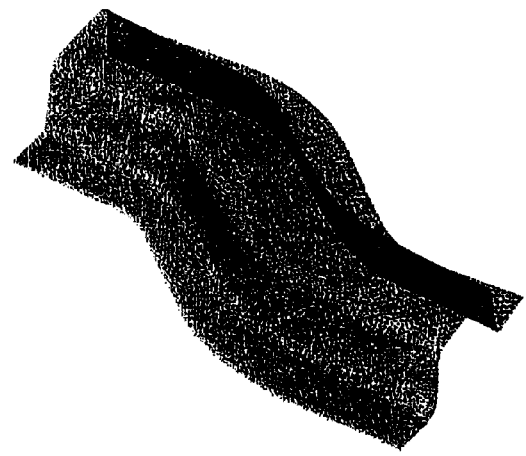
FIG. 3 is a diagram of measurement by a three coordinate measuring machine.

It will be understood from FIGS. 8 and 9 that the difference between the actual forming shape (FIG. 8) or the simulation shape (FIG. 9) obtained by computer simulation and the reference shape, that is, a different part between the two three-dimensional shapes can be accurately grasped. In this regards, the method of the invention is more excellent than the conventional method shown in FIGS. 2 to 4 by far.

Since the shape error can be determined by obtaining the principle curvatures of corresponding positions, the method can be applied without accurately coinciding the reference positions of two three-dimensional shapes with each other, and the cause of the shape error such as a partial curve can be found.

Further, by calculating the ratio of the same labels from the labels (a), (b), and (c) and using it as a coincidence ratio, how much the shapes coincide with each other as a whole can be objectively shown by a numerical value and an error can be easily discriminated even when the reference shape is complicated.

(Embodiment 3)

Figure 10:
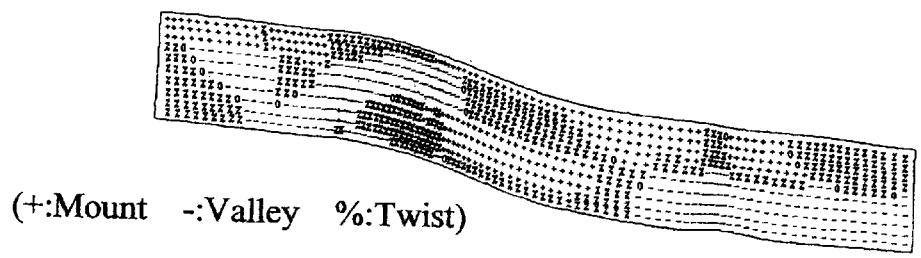
FIG. 10 shows another example of applying the method of the invention on the basis of measurement data.
Figure 11:
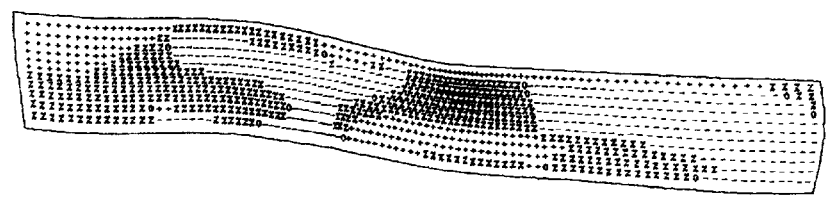
FIG. 11 shows another example of applying the method of the invention on the basis of the result of numerical simulation.
Figure 12:
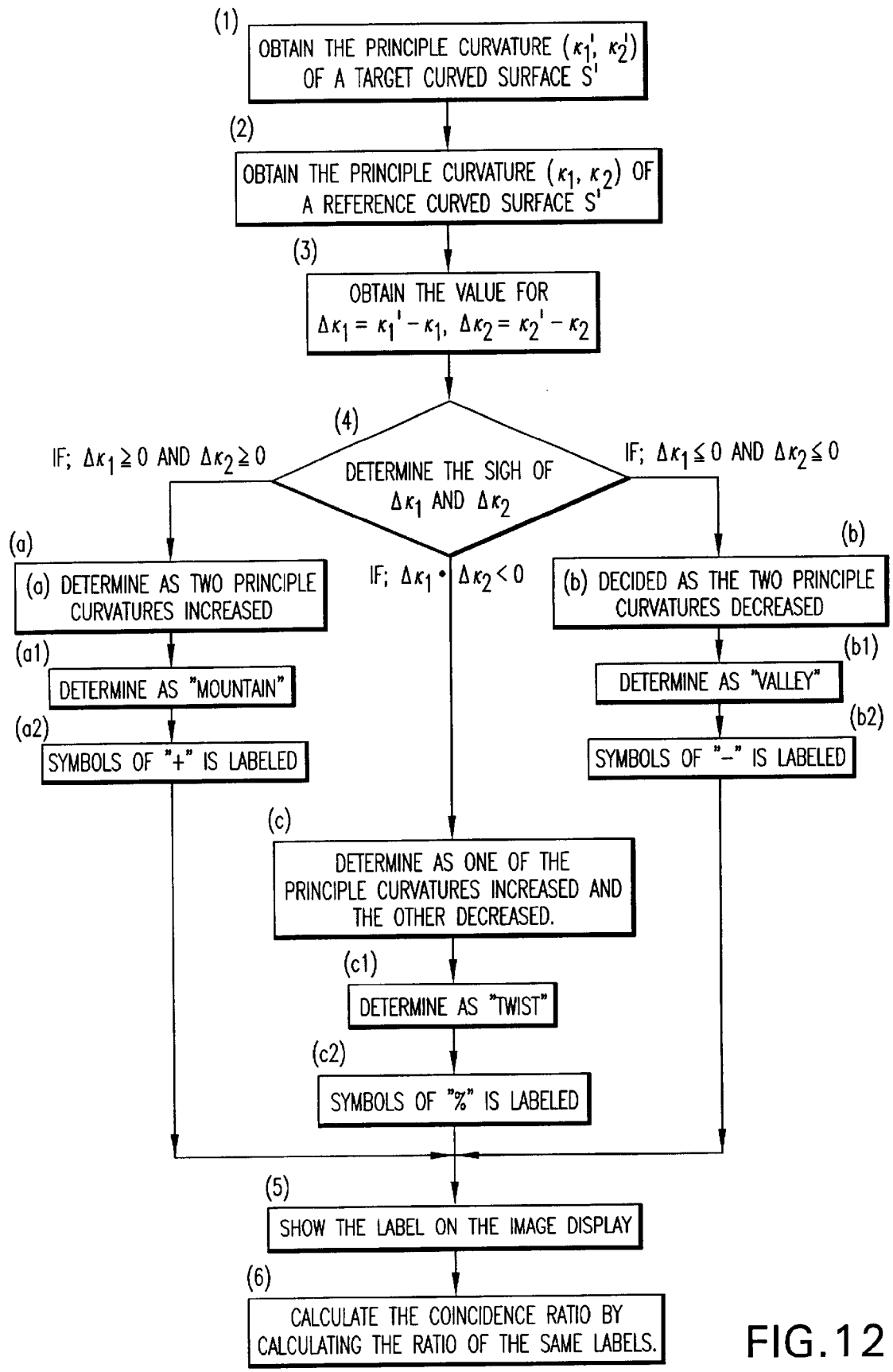
FIG. 12 outlines the steps of the method in accordance with the present invention.

FIGS. 10 and 11 show comparison examples with respect to the "side face" of FIG. 1. FIG. 10 shows an application example of the method of the invention on the basis of the measurement data. FIG. 11 shows an application example of the method of the invention on the basis of the result of the numerical simulation. The coincidence ratio (ψ) in this case is 52.47%.

POSSIBILITY OF INDUSTRIAL UTILIZATION

As mentioned above, the invention provides a simple and general method of defining a local shape error in a free-form surface. According to the method, the difference between the principle curvature of a curved surface including an error and that of a reference curved surface is used. The reference curved surface is usually expressed by CAD data. The curved surface including an error is obtained by approximating a group of discrete points such as measurement points and node points in numerical simulation. The principle curvature is used to evaluate a curved surface from the viewpoint of design, to form a curved surface, and the like, but is conventionally not used numerically to formulate or compare a shape error. The inventors of the present invention formulated a local shape error and performed FEM simulation and CMM data comparison by using the CAD data as a reference.

According to the method of the invention, "extended Gaussian curvature" is newly defined and a local shape error in a free-form surface is classified into three types (mountain, valley, and twist) by comparing the free-from surface with a CAD curved surface as a reference. The coincidence ratio calculating method using the image process technique is also proposed. With respect to the example of evaluating the forming discrepancy, the method of the invention was proved to be effective and mighty from the comparison of the deviation pattern of the actual measurement data and the numerical simulation data from the CAD data which is referred to.

By using the method of the invention, the discrepancy of the forming item which is formed by a press work such as the body of an automobile or the like can be evaluated objectively and numerically from, for example, the actual measurement data or the accuracy of the numerical simulation can be evaluated objectively and numerically. Consequently, the method of the invention can be widely industrially used with a three coordinate measuring machine, a CAD system, a CAM system, or a simulation system in the wide-ranged forming processing field or the shape measuring and evaluating field.

As mentioned above, according to the method of determining the shape error in the free-form surface of the invention, there are excellent effects such that the different part between two three-dimensional shapes can be accurately grasped, the shape error can be determined by obtaining the principle curvatures of the corresponding positions, the cause of the occurrence of an error such as a partial curve can be found, how much the shapes coincide with each other as a whole can be shown by an objective numerical value as a ratio, and the error can be easily determined even in a case where the reference shape is complicated.

Although the invention has been described in accordance with some preferred embodiments, it can be understood the range of the right included in the invention is not limited by the embodiments. On the contrary, the range of the right of the invention includes all of improvements, modifications, and equivalents included in the scope of the appended claims.

What is claimed is:

1. A method of determining a shape error in a free-form surface, comprising the steps of:

obtaining a principle curvature of a target curved surface S' and a principle curvature of a corresponding position of a reference surface S; and displaying each part while classifying the principle curvatures into (a) a case where the two principle curvatures increase, (b) a case where the two principle curvatures decrease, and (c) a case where one of the principle curvatures increases and the other decreases from the difference between the principle curvatures.

2. The method of determining a shape error in a free-form surface according to claim 1, wherein $\Delta\kappa_1=\kappa_1'-\kappa_1$ and $\Delta\kappa_2=\kappa_2'-\kappa_2$ are obtained from the principle curvature ($\kappa_1'$, $\kappa_2'$) of the target curved surface S' and the principle curvature ($\kappa_1$, $\kappa_2$) at the corresponding position of the reference curved surface S, (1) when $\Delta\kappa_1 \geqq 0$ and $\Delta\kappa_2 \geqq 0$, (a) it is determined that the two curvatures increase, (2) when $\Delta\kappa_1 \leqq 0$ and $\Delta\kappa \leqq 0$, (b) it is determined that two curvatures decrease, and (3) when $\Delta\kappa_1 \cdot \Delta\kappa_2 < 0$, (c) it is determined that one of the principle curvatures increases and the other decreases.

3. The method of determining a shape error in a free-form surface according to claim 1, wherein (a), (b) and (c) are determined as mountain, valley, and twist, respectively, and are displayed in different symbols or colors on an image.

4. The method of determining a shape error in a free-form surface according to claim 1, wherein the ratio of the same labels is calculated from the labels (a), (b), and (c) and is used as a coincidence ratio.

5. The method of determining a shape error in a free-form surface according to claim 4, wherein the absolute value of $\Delta\kappa_1 \cdot \Delta\kappa_2$ is calculated every label of (a), (b), and (c) and is quantified.

6. The method of determining a shape error in a free-form surface according to claim 2, wherein (a), (b), and (c) are determined as mountain, valley, and twist, respectively, and are displayed in different symbols or colors on an image.

7. The method of determining a shape error in a free-form surface according to claim 2, wherein the ratio of the same labels is calculated from the labels (a), (b), and (c) and is used as a coincidence ratio.

8. The method of determining a shape error in a free-form surface according to claim 3, wherein the ratio of the same labels is calculated from the labels (a), (b), and (c) and is used as a coincidence ratio.

9. The method of determining a shape error in a free-form surface according to claim 3, wherein the absolute value of $\Delta\kappa_1 \cdot \Delta\kappa_2$ is calculated every label of (a), (b), and (c) and is quantified.

10. The method of determining a shape error in a free-form surface according to claim 4, wherein the absolute value of $\Delta\kappa_1 \cdot \Delta\kappa_2$ is calculated every label of (a), (b), and (c) and is quantified.

* * * * *